June 11, 1940.                E. N. ALLEN ET AL                2,204,006
                               OUTLET BOX CLOSURE
                               Filed Oct. 23, 1937
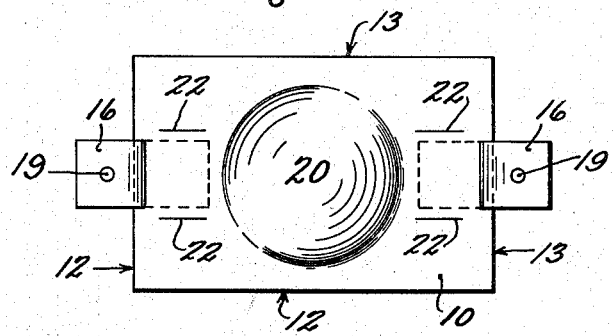
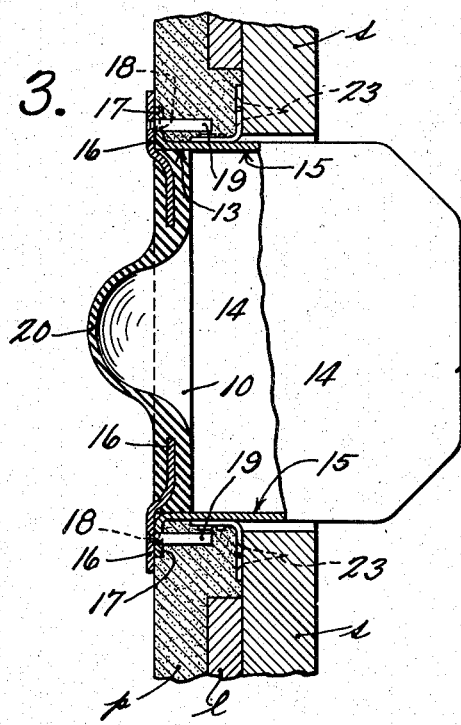
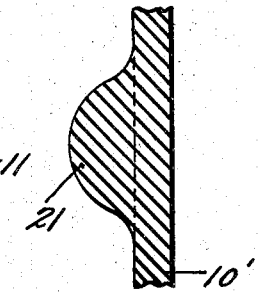
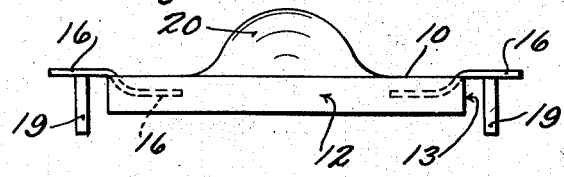
INVENTORS
Edward N. Allen and Robert L. Hinckley
BY
Chapin & Neal
ATTORNEYS Patented June 11, 1940

2,204,006

UNITED STATES PATENT OFFICE 2,204,006

OUTLET BOX CLOSURE

Edward N. Allen and Robert L. Hinckley, Springfield, Mass.

Application October 23, 1937, Serial No. 170,517

2 Claims. (Cl. 220—3.4)

This invention relates to improvements in temporary closures for outlet boxes, such as are used in connection with electrical wiring.

These outlet boxes are installed in buildings during the course of construction of the same and prior to the plastering of the walls thereof. Naturally, during the plastering operation, these boxes become more or less filled with plaster and the electrician has to lose considerable time in digging out the plaster before he can commence his electrical work. Sometimes, also, the entire box is filled and completely covered so that the electrician has great difficulty in locating the box in the smooth, unbroken surface of the wall. Another difficulty is that the small screw-threaded holes in the outlet box become filled with plaster which has to be dug out by the electrician and in so doing it often happens that the screw threads are injured. Contact of the wet plaster with unprotected surfaces of the outlet box causes such surfaces to rust and the aforesaid screw-threaded holes are likely to rust. The plaster, used at present, is extremely hard and difficult to remove from the boxes and especially from the small screw threaded holes. Moreover, the plaster often fills the space in back of the small lugs in which said holes are formed and, unless a clearance space is formed in the plaster to receive the inner ends of the screws which are later threaded into the holes, there is danger that the screws may be twisted off or the threads on them, or in the holes, stripped during the operation of turning in the screws.

This invention has for an object the provision of an outlet box closure which will overcome the difficulties above set forth.

The invention also has for an object to provide an outlet box cover with an outstanding projection which will enable the box to be located, even if it is completely embedded in the plaster, and such projection is made of elastic material so that it may be deflected inwardly by the plastering tool as it is drawn over the wall and across the cover and yet will subsequently spring back, penetrating the plaster and assuming its original position to perform its locating function. Being of elastic material, it cannot readily be knocked off by the plasterer, as is often the case where the projection is made of stiff metal.

Another object of the invention is to provide a closure which is constructed of elastic material, such as rubber or the like, and which is adapted to fit into the open end of the outlet box like a plug and close the same,—the closure being held in place by frictional engagement with the walls of the box and being quickly and easily applied without the use of tools.

A further object of the invention is to provide a cover for outlet boxes, having means thereon for entering and filling the screw threaded holes in the lugs of the outlet box and preventing entrance of any substantial amount of plaster therein.

A further object is to provide the aforesaid hole-filling means in the form of long pins which not only pass into the screw threaded holes but also completely through and well beyond the same for the purpose of insuring that there shall be clearance spaces in the plaster in back of the lugs to receive the fastening screws which are later threaded into said holes.

Other objects will appear from the following description and will be pointed out in the appended claims.

The invention will be disclosed with reference to the accompanying drawing in which:

Fig. 1 is a plan view of an outlet box closure embodying the invention;

Fig. 2 is a side elevational view thereof;

Fig. 3 is a sectional elevational view showing the closure applied to an outlet box mounted in a plastered wall; and Fig. 4 is a fragmentary sectional elevational view of a modified form of closure.

The outlet box closure is preferably constructed of rubber or like elastic material and consists of a member 10 of such material, having a shape and size to conform with the shape and size of the open outer end of the particular kind of outlet box being used. In this case, the member 10 is of rectangular shape but it may have any other shape and size necessary to fit the desired kind of box. The essential thing is that the member 10 shall be capable of filling the open outer end of an outlet box, such as that shown at 11 in Fig. 3, fitting into the same like a plug for securing a complete and tight closure. Naturally, the member should be slightly larger than the opening in the box so that it will have to be compressed when put in place, whereby its side and end edges 12 and 13 will tightly engage the side and end walls 14 and 15, respectively, of the box and provide a strong frictional engagement to hold the member in place.

To prevent the member 10 from being pressed into the box too far, limiting projections are provided on it to engage the outer edges of the box, as stops. As shown, two such projections are provided in the shape of small metal pieces or clips preferably of brass or other non-rustable metal and which are suitably fixed to member 10, as by embedding them in the rubber during the process of molding the same. These parts 16 are preferably offset from the outer face of member 10 so that such face will lie flush with the outer edges of the box when the parts 16 engage and abut two of such edges.

The parts 16 are preferably made to overlie the lugs 17 of the outlet box. These lugs have, one in each, screw threaded holes 18 into which the usual attaching screws (not shown) are later threaded. Pins 19 are fixed in any suitable way, one to each, of these parts 16 projecting inwardly from the inner faces thereof. These pins are so located and are of such size as to enter the holes 18 and substantially fill the same. Preferably also, they are of such length as to extend a substantial distance inwardly in back of the lugs 17 as shown. Thus, when the plaster p is applied to the lath l and around the box 11, these pins 19 will serve like cores in a mold. The plaster will flow around the pins 19 but, when these pins are withdrawn, molded holes will be formed in the plaster into which the ends of the screws may pass. Of course, if the plaster does not happen to flow around these pins, the molded holes will not be formed or they may be only partially or imperfectly formed but, in any event, a clearance space will be available for each screw and that is the desired object.

It may, and often does, happen that the plasterer will cover the entire box and its cover with plaster in which case the electrician will have difficulty in locating the box. To overcome this difficulty, a projection 20 is provided on the cover member 10. This projection extends outwardly from the outer face of member 10 far enough to penetrate completely through any layer of plaster that is likely to be applied over the body of the cover member 10. Locating means have been provided heretofore in the form of rigid metal projections from the cover but these in many cases are intentionally broken off or bashed in by the plasterer because they stand in the way of drawing a plastering tool across the box. This invention provides a projection which is deflectible by the plastering tool and will spring back into position to perform its locating function after the tool has passed. The plasterer therefore does not resent the presence of the projection because it will yield and allow him to make one straight sweep of a tool along the wall and across the cover of the outlet box. The preferred arrangement is shown in Figs. 1 to 3, in which the projection 20 is elastic and constructed in partly-spherical or outwardly-bowed form. The wall of projection 20 is made thinner than the member 10 so as to be more readily yieldable. This projection is like a piece of a hollow rubber ball and it may readily be pressed inwardly so as to lie in or inside the plane in which the outer edges of box 11 are located. Naturally, this projection will spring outwardly into the illustrated position, once the pushing force is relaxed.

It is possible to secure the described result by having the projection 20 elastically supported, as it is in fact by member 10. This member, being of rubber and held only along its four edges, can be pushed inwardly, assuming a slightly bowed form, and will spring back when released. Thus, a solid projection 21, such as is shown in Fig. 4, may be used on the cover 10' and all the elasticity needed to enable this projection to be deflected inwardly to the desired degree may be obtained from the member 10' itself. It is preferred, however, to use the arrangement shown in Figs. 1 to 3, in which case it is not necessarily essential for all purposes that the member 10 be of elastic material, although that is the form at present preferred.

To enable easy removal of the closure member, one or more slits are provided in member 10, extending completely therethrough. As shown, four slits 22 are provided, one on each side of and closely adjacent each part 16. A screw driver may be inserted into any one of these slits to pry out the member 10. Since the pins 19 are likely to be the most difficult to remove, the slits 22 are made near the clips 16 so that the prying force may be applied, as nearly as possible directly to the clips.

In use, the box 11 is secured, as by screws 23 to suitable supports s. The electrician then inserts the pins 19 into holes 18 and presses the closure member 10 into the opening in the open outer end of box 11. The rubber member 10 is pressed in as far as the clips 16 will permit and it will then lie flush with the outer edges of box 11 as shown in Fig. 3. The box is set on its supports s so that said edges will lie substantially in or slightly below the plane of the finished plaster wall. The plaster is then applied around the box. However, no plaster can enter the box proper nor the screw holes 18 and none can fill the space occupied by pins 19 in back of lugs 17. The plasterer can smooth off the plastered surface with one straight sweep of the tool, drawing it across the outlet box and over cover 10, the projection 20 or 21 as the case may be, yielding inwardly to permit such action and springing out again to definitely locate the box, even though the member 10 be covered with a layer of plaster. After the plaster has hardened, the electrician simply pries the member 10 out of box 11 and the latter is clean and free from plaster as are the screw holes 18 so that his electrical work can be done without delay.

The rubber cover 10 is important in that it can be quickly and easily applied to and removed from the box. It can be used over and over again. Moreover, the cover clings tightly to the walls of the box and effectively closes and seals the same. It is non-rustable. In addition, the cover is yieldable. Thus, if a box is distorted or jammed in or sprung out or otherwise deformed, the rubber cover 10 can yield inwardly or expand outwardly as circumstances may require to fit the box and maintain a tight closure.

The invention thus provides an outlet box closure which is of simple and inexpensive construction; easy to install and remove; and effective in sealing the box opening and its screw threaded holes against the entry of plaster.

What we claim is:

1. A temporary closure for an outlet box, comprising, a substantially flat body the outer face of which is intended to lie substantially flush with the outer face of a plastered surface, and a member connected to said body and resiliently urged outwardly into a position wherein it projects beyond said face of the body for the purpose of penetrating the plastered surface if said body is embedded therein, said member when in said position presenting a cam-like surface adapted to be engaged by a plasterer's trowel, whereby said member may be cammed inwardly into the plane of said face of the body and then spring back into said position after passage of said trowel.

2. A temporary closure for an outlet box, comprising a substantially flat body the outer face of which is intended to lie substantially flush with the outer face of a plastered surface, and a member constructed of elastic material and in the form of a segment of a hollow sphere, said member being fixed along its margin to said body and normally projecting outwardly beyond the outer face of the body in outwardly bowed form and yieldingly held in such position by the elasticity of the material of which it is constructed, said member being yieldable and when engaged by the plasterer's trowel adapted to be cammed inwardly into the plane of the outer face of the body and subsequently to spring back into its original position and penetrate the plastered surface in case the body is embedded therein.

EDWARD N. ALLEN,
ROBERT L. HINCKLEY.